March 16, 1965 KEIJI OKANIWA ETAL 3,173,489
METHOD OF PREVENTING EXPLOSIONS IN WASTE GAS RECOVERY
SYSTEMS FOR OXYGEN TOP-BLOWING CONVERTERS
Filed Oct. 29, 1962
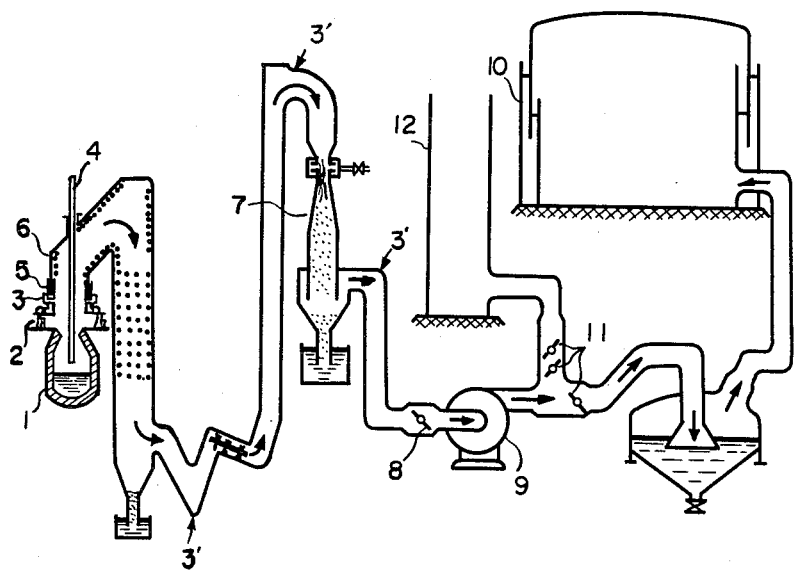
INVENTORS
Keiji Okaniwa
Isao Takatama
Shigeru Maehara
Isoji Igarashi
BY Wenderoth, Lind & Ponack
ATTORNEYS United States Patent Office 3,173,489
Patented Mar. 16, 1965

3,173,489
METHOD OF PREVENTING EXPLOSIONS IN WASTE GAS RECOVERY SYSTEMS FOR OXYGEN TOP-BLOWING CONVERTERS
Keiji Okaniwa and Isao Takatama, Tsurumi-ku, Yokohama, Kanagawa, and Shigeru Maehara and Isoji Igarashi, Yawata, Fukuoka, Japan, assignors to Yawata Iron & Steel Co., Ltd., and Yokoyama Engineering Co., Ltd., Tokyo, Japan
Filed Oct. 29, 1962, Ser. No. 233,610
3 Claims. (Cl. 169—1)

This invention relates to methods of emergency operation of an oxygen top-blowing converter having a device for recovering unburned waste gas from the converter.

The term "emergency-operating method" as used hereinafter means an operating method intended to prevent the explosion of the waste gas in the event of total or partial interruption of electric power service for the machines and meters used in the unburned waste gas recovering system for an oxygen top-blowing converter or in an emergency in the operation of the converter.

The waste gas discharged from an oxygen top-blowing converter is a precious valuable gas containing 80 to 90% CO during the period of maximum gas production during blowing and has such a large amount of sensible heat that its temperature at the outlet of the converter reaches 1450° C. It is therefore, desired to effectively utilize such unburned waste gas and sensible heat.

As a result of experimenting with a device for recovering the waste gas in the unburned condition in a converter of a capacity of 2 tons with a view to industrializing the recovery of the waste gas of the converter in the unburned condition to suggest systems for effectively treating such waste gas, we have succeeded in establishing some advantageous systems for safely and surely recovering waste gases in an unburned state. With such systems, various defects heretofore encountered when installing a waste heat boiler in a system for treating the waste gas of a large converter can be greatly reduced and the converter operation can be made much smoother than in any conventional method.

However, in recovering the waste gas of a converter in the unburned condition, an unexpected dangerous condition will occur if there is a partial or total suspension of electric power service for such various kinds of machines as, for example, a gas blower, soft water feed pump and pure water feed pump and meters in the system used for such recovery, or in the event of any emergency in the converter operation. For example, in a large converter, a high voltage electric current source of 33,000 volts is used for operating a gas blower, soft water feed pump, pure water feed pump, lance cooling water pump, hood cooling pump and a skirt blower nitrogen compressor, while an electric current source of 200 volts is used for operating all the pumps other than those mentioned above, and an electric current source of 100 volts is used for operating automatic controls and other meters.

Now, if it is supposed that the electric current source of 33,000 volts is interrupted, the suction blower, the principal action of which is to draw the waste gas discharged from the converter into the recovery system, will first stop. Consequently if the blowing is continued in the converter in spite of the interruption of the electric current, the cooler forming part of the recovery system will be filled with the naturally flowing waste gas and the rest of the waste gas will overflow into the outside air through the opening between the converter and the cooler. It can be anticipated that, as soon as the waste gas rich in CO comes into contact with the outside air, a severe explosion might occur. It is also anticipated that, if the pump system supplied from the same electric current source stops, the steam generated in the cooler system will cause an explosion. Therefore, at the time of an interruption of the electric current, the blowing operation of the converter must be stopped at once.

Further, if it is supposed that the electric current of 100 volts is interrupted, the automatic control system including the flow regulating valve for regulating the gas pressure within the cooler so that it is kept at a fixed value according to the amount of waste gas generated will completely stop, the other meters will also instantaneously stop their dynamic indication, and thereby the operation of the converter will turn into an uncontrolled operation. This is a dangerous condition unthinkable in a system for recovering in an unburned state the explosive waste gas of the converter.

Therefore, in such case, it will naturally be necessary to automatically stop the operation of the converter simultaneously with the interruption of the electric current.

An object of the present invention is to provide a converter operating method wherein the danger of explosion during an emergency in the operation of a top-blowing converter having an unburned waste gas recovering system can be safely and surely prevented by a simple operation without providing any special means therefor.

The object of the present invention is attained by operation of a top-blowing converter having an unburned waste gas recovering system consisting mainly of a waste gas cooler provided above the opening of the converter, a suction blower and a gas holder during partial or total interruption of electric power from power sources for the said system or during any emergency in the operation of the converter comprising stopping blowing oxygen for refinement, simultaneously injecting an inert gas into the flue of the waste gas cooler from around the edge of the opening of the cooler opposite the opening of the converter before any air enters the flue opening of the said waste gas cooler so that the inert gas is interposed between the unburned waste gas in the said flue and the air entering the said flue after the inert gas is injected and discharging into the atmosphere the unburned waste gas present in the recovering system.

In the event something is wrong with the current source for the blower system, the unburned waste gas can be caused to flow into the atmosphere by the rotary inertia energy of the gas blower.

In order to prevent air from coming in through the gap between the opening of the converter and the lower edge of the opening into waste gas cooler while the inert gas is being forced into the gas cooler, the said gap may be kept air-tight by the formation of an annular curtain of the inert gas.

Further, in the present invention, in order that the said waste gas in a stagnant zone of the unburned waste gas recovering system can be completely exhausted from the system in an emergency, the insert gas can be injected into the said system in any part of the said system.

The drawing schematically shows an oxygen top-blowing converter provided with an unburned waste gas recovering system.

The waste gas discharged out of a converter 1 will enter a waste gas cooler 6 while kept entirely separate from the outside air by means of a surrounding inert gas curtain 2, will be cooled to several hundred degrees in the said waste gas cooler 6, will be led to a dust removing device 7, will have more than 99% of the dust removed therefrom, will be cooled to the normal temperature and will reach a suction blower 9 through a flow regulating valve 8.

The suction blower 9 serves also as a pressure blower for a gas holder 10. The waste gas will pass through a three-way change-over valve 11 and will be stored in a gas holder 10. In case the composition of the recovered waste gas is not proper, the waste gas should be discharged through a discharging tower 12 by switching through a discharging tower 12 by switching the three-way change-over valve. The waste gas discharged out of the converter will contain 80 to 90% CO at the time of the maximum production of waste gas during blowing and will be at a high temperature of 1450° C.

This gas is to be led to the waste gas cooler 6 set just above the converter 1. The converter opening and the hood or skirt part 5 of the cooler inlet are usually kept spaced apart so as not to interfere with the tilting of the converter, pouring in of molten pig iron, pouring out of molten steel and other steel manufacturing operations. However, if the converter opening is left spaced from the skirt, when the gas pressure within the cooler 6 is higher than the pressure of the outside air, the waste gas will leak out into the atmosphere, but when the gas pressure is lower than the pressure of the outside air, the outside air will enter the cooler.

The leaking waste gas will burn with the oxygen in the outside air, producing an undersirable condition or will float in the unburned state near the converter opening and will become a problem from the viewpoint of the environmental sanitation of the converter operators. On the other hand, the outside air entering the waste gas flowing into the cooler will contact and burn the waste gas within the cooler 6 and will eliminate the CO contained in the waste gas or will flow through the cooler together with the waste gas in the unburned condition and will cause an unexpected explosion in the downstream end of the cooler or in the flue following the cooler. Anyhow, these are contary to the object of safely and surely recovering the waste gas in an unburned condition. In order to avoid these troubles, according to the normal method, the inlet part of the cooler and the periphery of the converter opening are anularly enclosed with an inert gas such as nitrogen so that a gas wall or curtain 2 is formed to perfectly separate the waste gas from the outside air.

The operating method according to the present invention at the time when the electric power source for the waste gas recovering system is not in order or in any other emergency, for example, when the electric power from all the power sources for the recovering system have been accidently interrupted will now be explained.

In such an emergency as the interruption of electric power the blowing-in of oxygen is stopped at once to suspend the refining operation in the converter and the lance 4 is pulled up out of the converter so that the production of the waste gas may be quickly stopped. At the same time the waste gas remaining in abundance within the recovery system should be exhausted. The inertia energy of the suction blower serves to accomplish this purpose, because the operation of the suction blower itself has been already suspended due to the electric stoppage. On the other hand, an inert gas, preferably nitrogen gas, is blown into the recovery system through the main nitrogen injection pipe 3 installed at the hood and the auxiliary nitrogen injection pipes 3' installed at several bends in the gas conducting pipe by fully opening the valves of said nitrogen injection pipes. The reason for blowing the inert gas into the recovery system is for preventing the immediate contact of the remaining waste gas with the air which it is expected will enter the recovery system through the gap between the mouth of the converter and the lower edge part of the hood when the purge of the waste gas from said recovery system has been substantially finished. This purge operation will continue for several minutes, preferably 3 minutes and will be automatically stopped by means of a timer at the end of this time. During the purging operation an annular curtain of an inert gas such as nitrogen is formed at the gap between the mouth of the converter and the lower edge of the hood to prevent the entry of the outside air. When the waste gas remaining in the recovery system, even in the stagnant zone of the recovery system, has been substantially exhausted, said annular curtain of the waste gas is removed in order to enconomize on the use of nitrogen, and consequently the outside air enters the recovery system. Thus, in the waste gas recovery system there are formed three phases of gases; that is, a small amount of waste gas remaining in the recovery system, nitrogen, and air coming from the outside. These phases are in a sandwich-form. Therefore, the introduction of nitrogen into the recovery system serves to purge the waste gas remaining in the recovery system into the open air in collaboration wtih the inertia of the suction blower and at the same time to prevent the immediate contact of the waste gas remaining in the system with the outside air coming through the gap between the mouth of converter and the lower edge part of the hood. Thus, the accidental explosion of the waste gas in an emergency due to an electric stoppage can be avoided during recovery of the waste gas rich in CO generated in the operation of an oxygen top blowing converter.

What we claim is:

1. A method of preventing the danger of explosion of waste gas in an emergency or electric current stoppage during the operation of recovering unburned waste gas from an oxygen top blowing converter in a waste gas recovery system having a hood, a suction blower, a waste gas conducting pipe between said hood and said blower, a main inert gas injection pipe around the bottom of said hood having a valve therein controlling the inlet of gas into said pipe, and several auxiliary inert gas injection pipes installed at the bends in said waste gas conducting pipe and having valves therein controlling the inlet of gas into said pipes, said method comprising the steps of stopping the blowing of oxygen into the converter, maintaining the suction blower free to continue rotating due to its inertia for exhausting the waste gas remaining in abundance within the recovery system when the emergency occurred, simultaneously blowing an inert gas into the recovery system through the main inert gas pipe and the auxiliary inert gas injection pipes to purge said remaining waste gas into the open air by fully opening the valves of said pipes, simultaneously forming an annular curtain of inert gas at the gap between the mouth of the converter and the lower edge part of the hood to prevent the entry of outside air into the recovery system, and then stopping the flow of said inert gas, thereby permitting the entry of the outside air through said gap into the recovery system after several minutes, so as to form three sequential phases of gases within the recovery system, the remaining waste gas, injected inert and outside air, the inert gas preventing contact of the remaining waste gas with the entering outside air in the recovery system.

2. A method as claimed in claim 1 in which the flow of inert gas is stopped after three minutes.

3. A method as claimed in claim 1 in which the inert gas is nitrogen.

References Cited by the Examiner

UNITED STATES PATENTS

| | | | |
|---|---|---|---|
| 331,686 | 12/85 | Connally. | |
| 924,599 | 6/09 | Byers | 169—12 |
| 2,248,308 | 7/41 | Rice. | |
| 2,341,436 | 2/44 | Getz | 169—4 |
| 2,760,342 | 8/56 | Morrison | 169—12 |
| 2,831,467 | 4/58 | Guczky | 266—36 |
| 2,916,889 | 12/59 | Sattler | 169—11 |
| 3,084,039 | 4/63 | Baum | 266—35 X |
| 3,118,759 | 1/64 | Keiji Okaniwa et al. | 266—35 |
| 3,134,835 | 5/64 | Keiji Okaniwa | 266—35 |

EVERETT W. KIRBY, *Primary Examiner.*

EUGENE F. BLANCHARD, *Examiner.*